United States Patent [19]

Schafer

[11] Patent Number: 5,212,729
[45] Date of Patent: May 18, 1993

[54] COMPUTER DATA SECURITY DEVICE AND METHOD

[76] Inventor: Randy J. Schafer, 22 Colonial, Irvine, Calif. 92720

[21] Appl. No.: 823,994

[22] Filed: Jan. 22, 1992

[51] Int. Cl.$^5$ .............................................. H04L 9/00
[52] U.S. Cl. ......................................... 380/4; 380/25; 439/628
[58] Field of Search ..................... 380/3, 4, 23, 24, 25, 380/52, 22, 49, 50; 439/628

[56] References Cited

U.S. PATENT DOCUMENTS

| | | | |
|---|---|---|---|
| 4,757,533 | 7/1988 | Allen et al. | 380/25 |
| 4,787,027 | 11/1988 | Prugh et al. | 380/24 X |
| 4,800,590 | 1/1989 | Vaughan | 380/25 |
| 4,850,899 | 7/1989 | Maynard | 439/628 |
| 4,891,636 | 1/1990 | Ricker | 380/23 |
| 4,951,249 | 8/1990 | McClung et al. | 380/23 X |
| 4,972,470 | 11/1990 | Farago | 380/3 |

FOREIGN PATENT DOCUMENTS 0158072  6/1990  Japan ................................... 439/628

OTHER PUBLICATIONS

Anonymous; "Port Extender"; Research Disclosure, Jan. 1991, No. 321, K. Mason Publications.

Primary Examiner—Tod R. Swann
Attorney, Agent, or Firm—Kenneth W. Float

[57] ABSTRACT

An apparatus and method for protecting data stored on a disk of a computer. The invention provides data access protection using a security software program, a hardware key, and a user password to permit access to the hard or floppy disk used in the computer. The program stores the hardware key code and password on the disk and encrypts disk partition data, and without using the correct hardware key and password, the partition data is unreadable. An encryption algorithm operates at all times and prevents unauthorized entry once the computer is turned off. A microcircuit key provides a unique stored code when energized, and a key connector is provided to use the key. The computer connector may also be adapted to permit coupling of an output device to the computer. Versions are disclosed for use with ports having bidirectional and unidirectional input and output lines.

15 Claims, 3 Drawing Sheets

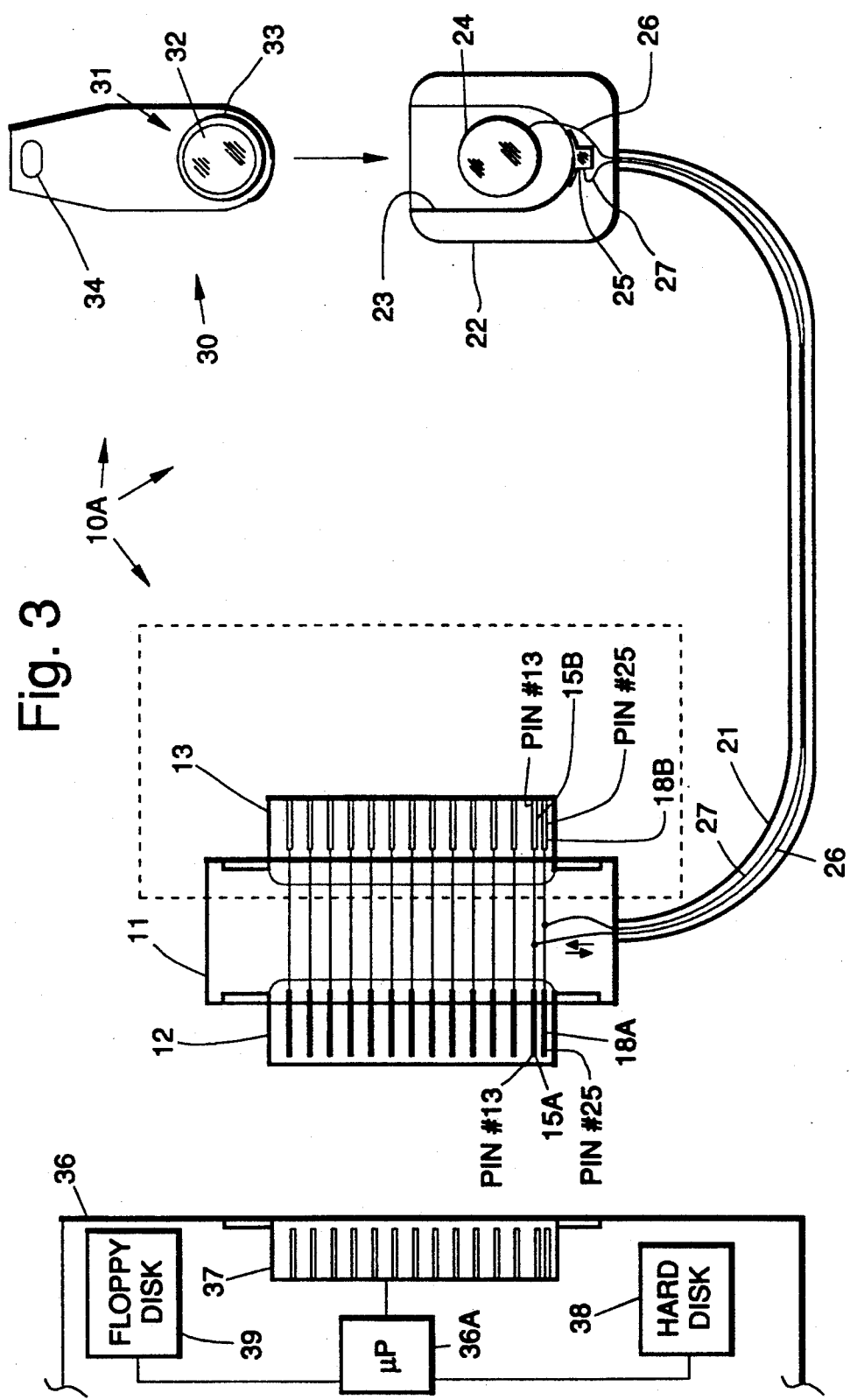

COMPUTER DATA SECURITY DEVICE AND METHOD

BACKGROUND

The present invention relates generally to computer data security devices, and more particularly, to a computer data security device and method for protecting data stored on hard disks in a personal computer.

Computer data security is very important to many users of computers, and in particular owners of personal and portable personal computers. Data security is generally discussed in an article entitled "Data Integrity and Security: Who's in Charge Here Anyway?", by Kenneth P. Weiss, published in *Chief Information Officer Journal*, Fall 1990 issue. Adequately protecting data stored on floppy and internal hard disks in a personal computer has produced numerous inventions directed to this end. Typically, software passwords have been employed to prevent unauthorized access to data stored on a floppy or hard disk. However, sophisticated users have the ability to penetrate such software protection devices. The use of "Smartcards" which provide both hardware and password security is one type of device that is intended for wide-spread use to protect computer data. The smartcard is discussed in "Smartcards: Smarter Than Passwords", by Lamont Wood, published in *Datamation*, Jul. 15, 1991. Hence there is a need for a device and method that provides for hardware protection in addition to software protection in protecting data stored on computer disks.

SUMMARY OF THE INVENTION

In order to meet the above objectives, the present invention provides for an apparatus and a method that protects data stored on a disk used with a computer, and in addition, a password is also registered and stored during installation. The installed boot patch interacts with and is responsive to the stored code provided by the key device. Once the patch is installed, when the computer boots up, a correct key must be inserted into the key connector. If the correct stored code is provided to the boot program, access to the computer's disk is provided. The boot patch installs disk data encryption/decryption (encoding/decoding) software into the computer's disk BIOS routine and thereafter is used at all times to transparently encode/decode partition data identifying the location of the data on the disk. Without the access code stored on the key device and proper password, the contents of the disk are unreadable. Both floppy and hard disks may be used with the present invention. Consequently, the present invention provides for hardware and software security of the data stored on the computer.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is an illustration of a second embodiment of a computer data security device in accordance with the principles of the present invention.

DETAILED DESCRIPTION

Figure 1:
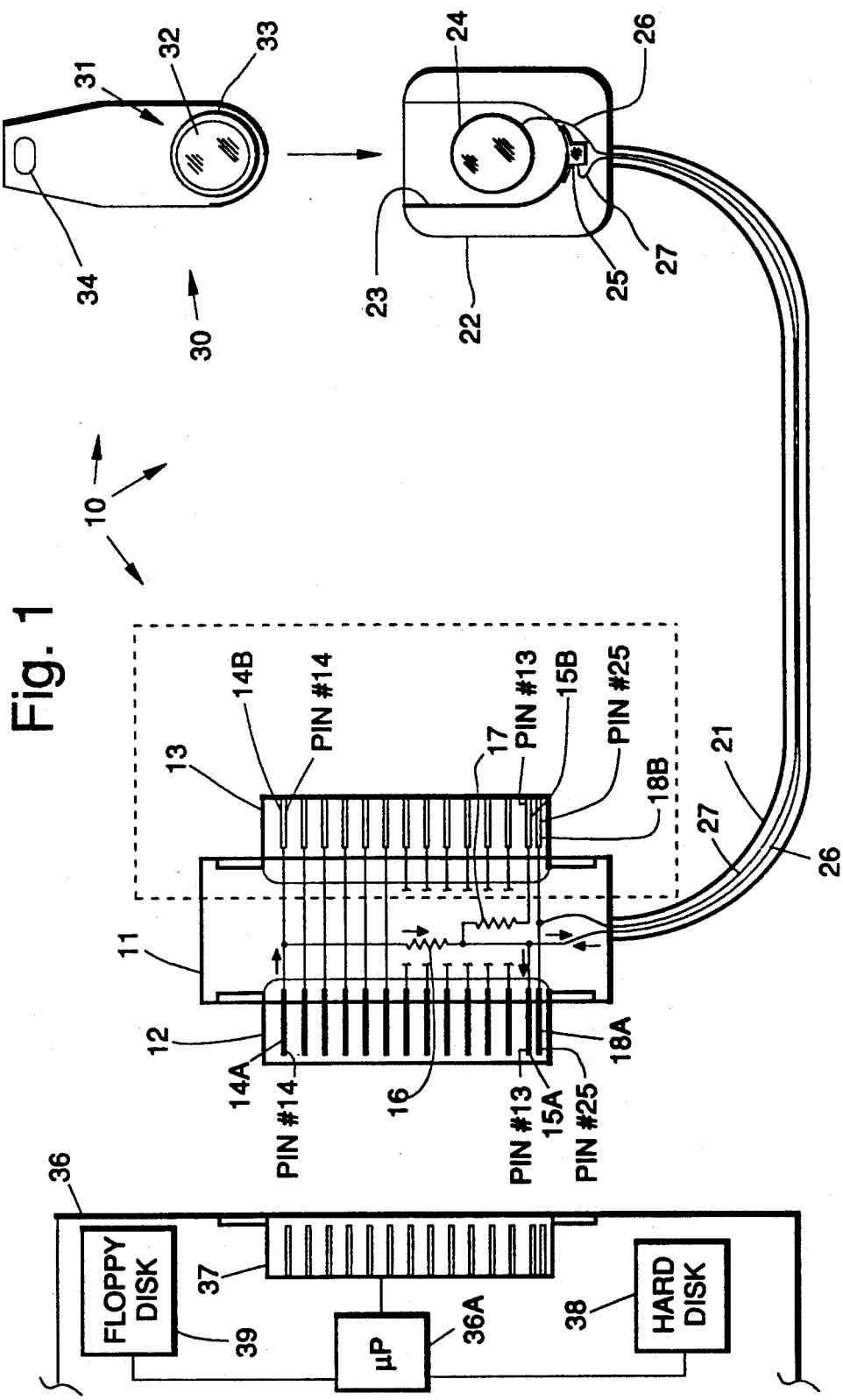
FIG. 1 is an illustration of a first embodiment of a computer data security device in accordance with the principles of the present invention.

Referring to the drawing figures, FIG. 1 is an illustration of a first embodiment of a computer data security device 10 in accordance with the principles of the present invention. The computer data security device 10 is used with a computer 36, such as a personal or portable computer, for example. The computer 36 has a microprocessor 36A, for example, that controls the operation of the computer 36. The computer 36 has a port 37, such as a parallel printer port, for example, which is used to interface the computer 36 to the computer data security device 10 of the present invention. The microprocessor 36A is coupled to the parallel port 37, to a hard disk drive 38 and a floppy disk drive 39. The computer data security device 10 is adapted to provide security for the data stored on disks employed in the hard and floppy disk drive 38, 39. more specifically, a portable personal computer by providing both hardware and software protection using security software in conjunction with a hardware "key" that is used to access data on the disk. The software (algorithm) encrypts or encodes the disk partition and without the hardware key, the partition data is unreadable. The encryption algorithm operates at all times and thus prevents unauthorized entry once the computer is turned off.

More particularly, the apparatus of the present invention comprises a computer data security device for use with a computer, such as a personal computer or portable computer, for example. The computer data security device comprises a key device including an integrated circuit having output and ground conductors. The key device is adapted to output a predetermined stored code when it is energized. A key connector is provided that couples the key device to connector that is adapted to interface the key device to the computer. The connector includes a male connector and an optional mating female connector having their corresponding pins wired together to form a single connector having male and female ends. In its simplest form, the connector is a male connector that is coupled to a port on the computer, such as the parallel printer port, for example. In its optional form, the connector is adapted to additionally permit coupling of an output device, such as a printer, to the computer. When used with a port on the computer that has no bidirectional data line, a first resistor is coupled between first and second predetermined pins of the connector, and a second resistor is coupled between the second predetermined pin of the male connector and a corresponding pin of the female connector. The first pin is used to couple data in one direction while the second pin is adapted to couple data in the opposite direction. One pin of each connector comprises a ground conductor. When used with a port on the computer that has a bidirectional data line, no resistors are required and the key connector is coupled to the bidirectional data line (output line) and the ground connector.

The key connector has first and second electrical conductors and is adapted to contact respective output and ground conductors of the key device. A first conductor is coupled between the second predetermined pin of the male connector and the output conductor of the key device, and a second conductor is coupled between the ground conductor of the connector means and the output conductor of the key device. Inserting the key device into the key connector such that respective electrical conductors thereof come in contact energizes the key device and outputs the predetermined stored code to a computer coupled to the connector means.

Software is provided as part of the present invention and it installs a patch into the boot sector of the disk that is read at computer startup or use. The key device that is to be used as the access key for the computer is used during the installation procedure.

The computer data security device 10 comprises a key device 30 including an integrated circuit 31 having output and ground conductors 32, 33. An opening 34 is provided in the key device 30 to permit it to be attached to a key chain, for example. The key device 30 may be made of molded plastic, for example. The integrated circuit 31 may be a device known as a Touch Serial Number, model DS1990, for example, manufactured by Dallas Semiconductor of Dallas Tex. The integrated circuit 31 of the key device 30 is adapted to output a predetermined stored code when it is energized. A complete understanding of the Touch Serial Number may be had from a reading of the "1991 Automatic Identification Data Book", available from Dallas Semiconductor. This book provides the technical information that allows one skilled in the art to use the Touch Serial Number as it is employed in the present invention.

A connector 11 is provided that is adapted to connect the computer data security device 10 to the computer 36. The connector 11 includes a male connector 12 and a mating female connector 13 having their corresponding pins wired together to form a single connector 11 having male and female ends. The connector 11 is also adapted to permit coupling of an output device (not shown), such as a printer, to the computer 36, and thus does not adversely affect the normal operation of the computer 36 and its peripherals. This aspect of providing for through coupling of signals to an output device is not required in the present invention, and is optional. This is illustrated by the dashed box surrounding the female connector 13. The embodiment shown in FIG. 1 illustrates a printer port having no bidirectional data line. Consequently, two data lines must be used to coupled to and from the key device 30. A first resistor 16 is coupled between first and second predetermined pins 14A, 15A of the connector 11, and a second resistor 17 is coupled between the second predetermined pin 15A of the male connector 12 and a corresponding pin 14B of the female connector 13. In the device that has been reduced to practice, the first resistor 16 is a 150 ohm resistor while the second resistor is a 7500 ohm resistor. The second resistor 17 is used to allow an input signal on the first pin 14A to be shared by the second pin 15A. The first pin 14A is used to pull data low in the key device 30. One pin 18A, 18B of each connector is tied together and comprises a ground conductor.

The connector 11 may be formed using conventional male and female DB-25 parallel port connectors that have corresponding male and female pins coupled together except for the the above-described resistive interconnections. The use of the resistors 16, 17 as described above does not affect the normal operation of the parallel port 37 of the computer 36. Specifically, pin numbers 14 of the male and female connectors 12, 13 are coupled together and the first resistor 16 is coupled from pin numbers 14 to pin number 13 of the male connector 12. The second resistor 17 is coupled from pin number 13 of the male connector 12 to pin number 13 of the female connector 13. Pin numbers 25 of the male and female connectors 12, 13 are coupled together and form the ground conductor.

A key connector 22 has first and second electrical conductors 24, 25 and is adapted to contact respective output and ground conductors 32, 33 of the key device 30. A cable 21 is provided that includes a first conductor 26 that is coupled between the second predetermined pin 15A of the male connector 12 and the output conductor 24 of the key connector 22, and a second conductor 27 is coupled between the ground conductor 18A of the connector 11 and the ground conductor 25 of the key connector 22. Inserting the key device 30 into the key connector 22 such that respective electrical conductors 32, 33, 24, 25 thereof come in contact energizes the key device 10 and outputs the predetermined stored code to a computer 36 coupled to the connector 11. The key device 30 is shown in an orientation that shows its conductors 32, 33. It is to be understood, however, that in operation, the key device 30 is inverted relative to the key connector 22 when it is inserted therein.

Figure 2:
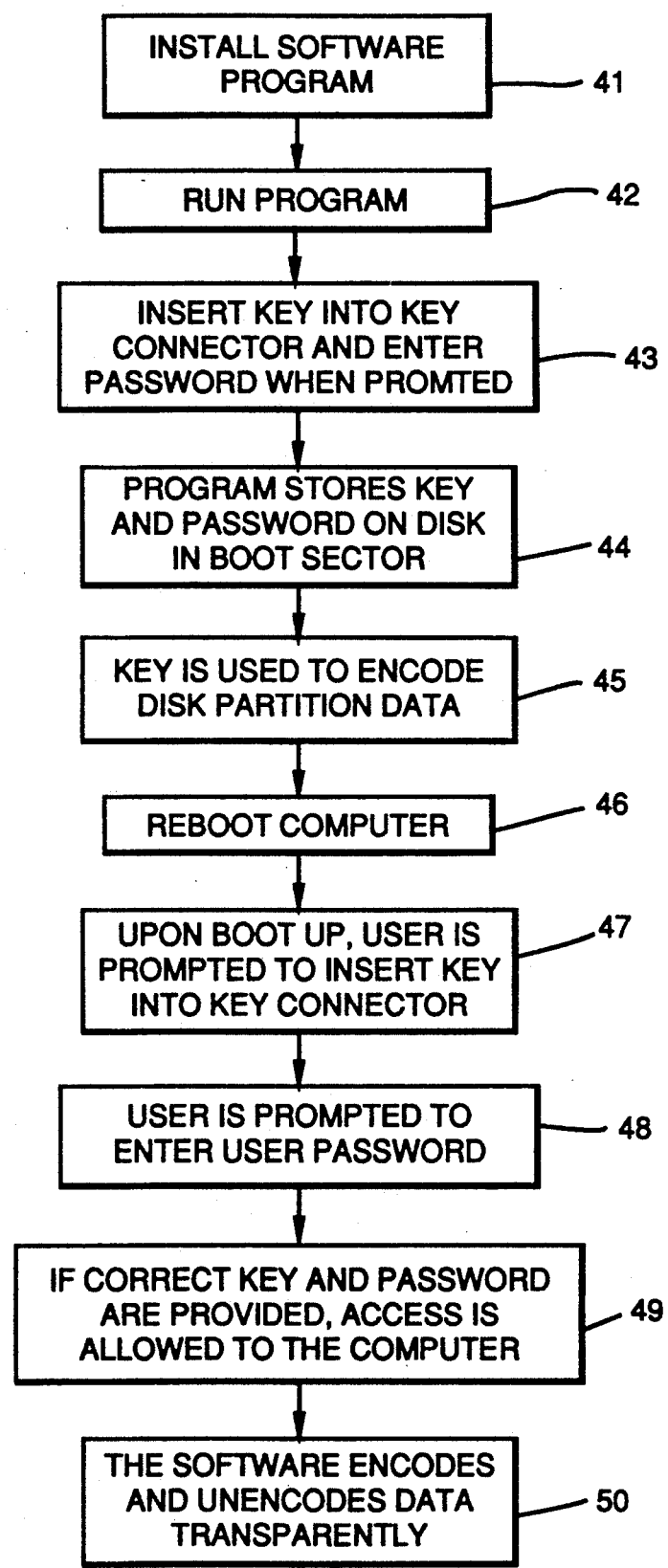
FIG. 2 is a flowchart illustrating the software flow employed in the computer that works in conjunction with the data security device of FIG. 1.

Operation of the data security device 10 of the present invention will be described in conjunction with FIGS. 1 and 2. FIG. 2 is a flowchart 40 illustrating the operational flow encountered in using the present invention with the computer 36 and that works in conjunction with the data security device 10 of FIG. 1.

A software program is provided as part of the present invention and it is installed into the computer 36 by a user prior to its normal operation, as is illustrated in box 41. To accomplish this, the program disk is inserted into a floppy disk 39 and the program is run, as is illustrated in box 42. The user inserts the key device 30 into the key connector 22, and the key device 30 is energized and the stored code is read therefrom, as is illustrated in box 43. The software program stores the code in the boot sector on the hard disk 38. The user is prompted for a user password and this is entered and verified, and is then stored on the hard or floppy disk 38, 39. This is illustrated in box 44. The code stored in the key device 30 is stored on the hard or floppy disk 38, 39 and is used by the software in the disk BIOS patch to encode or encrypt the partition data of the hard or floppy disk 38, 39, as is illustrated in box 45.

More particularly, the software installs a patch into a boot sector of the hard or floppy disk 38, 39 that is read at computer startup. The key device 30 that is to be used as an access key for the computer 36 is used during the installation procedure. In addition, the user password is also registered and stored during installation. The installed boot patch interacts with and is responsive to the stored code provided by the key device 30.

Then, after installation is complete, the computer is rebooted, or turned on, as is illustrated in box 46. Upon boot up, the user is prompted to insert the key device 30 into the key connector 22, as is illustrated in box 46. Consequently, once the patch is installed, when the computer 36 boots up, a correct key device 30 must be inserted into the key connector 22. If the correct key device 30 and stored code is provided when prompted by the boot program, the user is prompted for a user password, as is illustrated in box 48. If the correct password is provided, access to the computer 36 and the contents of its hard or floppy disks 38, 39 is permitted, as is illustrated in box 49.

The boot patch installs hard disk partition encryption (encoding) software into the disk BIOS routine and is used at all times during operation of the computer 36 to transparently encode and decode the data on the hard or floppy disk 38, 39, as is illustrated in box 50. Without the access code stored on the key device 30 and proper user password, the contents of the hard or floppy disk 38, 39 is unreadable. Consequently, the data security device 10 and software of the present invention provides for hardware and software security for the data stored in the computer 36.

FIG. 3 is an illustration of a second embodiment of a computer data security device 10A in accordance with the principles of the present invention. This second embodiment is substantially the same as the first embodiment, except that it is used with a port 37 having a bidirectional data line (the second pin 15A) and a ground conductor 18A. The bidirectionality of the data line is indicated by the opposed arrows adjacent the second conductor 27. Again, the aspect of providing for through coupling of signals to an output device is not required in the present invention, and is optional. This is again illustrated by the dashed box surrounding the female connector 13.

Thus there has been described a new and improved computer data security device and method for protecting data stored on hard disks in a personal computer. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A computer data security device for use with a computer, said device comprising:
   a key device comprising an integrated circuit having output and ground conductors, and wherein the key device is adapted to output a predetermined stored code when it is energized;
   a key connector having first and second electrical conductors adapted to contact the respective output and ground conductors of the key device, respectively;
   connector means for connecting between a predetermined port of the computer and the key connector, the connector means having a bidirectional data conductor and a ground conductor; and
   a first conductor coupled between the bidirectional data conductor in the connector means and the first conductor of the key connector, and a second conductor coupled between the ground conductor of the connector means and the second conductor of the key connector;
   and wherein placing the key device into the key connector such that respective electrical conductors thereof come in contact energizes the key device which outputs the predetermined stored code to a computer coupled to the connector means.

2. The computer data security device of claim 1 wherein the connector means comprises a male connector and a mating female connector having their corresponding pins wired together to form a single connector having male and female ends, and wherein the connector means is adapted to permit coupling of an output device to the computer by way of the port.

3. The computer data security device of claim 2 wherein the connector means comprises a first resistor coupled between a first unidirectional output pin and a second unidirectional input pin of the connector means, and wherein a second resistor is coupled between the second unidirectional input pin of the male connector and a corresponding pin of the female connector, and wherein the first conductor is coupled to the first unidirectional input pin and the second conductor is coupled to the ground conductor.

4. The computer data security device of claim 3 wherein the connector means comprises a male connector and a mating female connector having their corresponding pins wired together to form a single connector having male and female ends, and wherein the connector means is adapted to permit coupling of an output device to the computer by way of the port.

5. A computer data security device for use with a computer having a parallel port, said device comprising:
   a key device comprising an integrated circuit having output and ground conductors, and wherein the key device is adapted to output a predetermined stored code when it is energized;
   a key connector having first and second electrical conductors adapted to contact the respective output and ground conductors of the key device, respectively;
   parallel port connector means for connecting between a predetermined parallel port of the computer and the key connector, the parallel port connector means having a bidirectional data conductor and a ground conductor; and
   a first conductor coupled between the bidirectional data conductor in the connector means and the first conductor of the key connector, and a second conductor coupled between the ground conductor of the connector means and the second conductor of the key connector;
   and wherein placing the key device into the key connector such that respective electrical conductors thereof come in contact energizes the key device which outputs the predetermined stored code to a computer coupled to the parallel port connector means.

6. The computer data security device of claim 5 wherein the connector means comprises a male connector and a mating female connector having their corresponding pins wired together to form a single connector having male and female ends, and wherein the connector means is adapted to permit coupling of an output device to the computer by way of the port.

7. The computer data security device of claim 6 wherein the connector means comprises a first resistor coupled between a first unidirectional output pin and a second unidirectional input pin of the connector means, and wherein a second resistor is coupled between the second unidirectional input pin of the male connector and a corresponding pin of the female connector, and wherein the first conductor is coupled to the first unidirectional input pin and the second conductor is coupled to the ground conductor.

8. The computer data security device of claim 7 wherein the connector means comprises a male connector and a mating female connector having their corresponding pins wired together to form a single connector having male and female ends, and wherein the connector means is adapted to permit coupling of an output device to the computer by way of the port.

9. A method of provided computer data security, said method comprising the steps of:
  providing a key comprising an integrated circuit that is adapted to output a predetermined stored code when it is energized;
  providing a key connector coupled between a computer whose data is to be protected and a key connector that is adapted to contact the key;
  installing a software program on a disk that is to be protected by running an installation program and energizing the key to output the stored code that is stored on the disk in response to a first prompt provided by the installation program and entering a password that is stored on the disk in response to a second prompt provided by the installation program;
  rebooting the computer to run the installed program; and
  energizing the key to output the stored code that is stored on the disk in response to the first prompt provided by the program and entering the password in response to the second prompt provided by the program;
  wherein placing the key into the key connector outputs the stored code and properly entering of the password permits a user to access the data stored on the disk.

10. A computer data security device for use with a computer, said device comprising:
  a key device comprising an integrated circuit having output and ground conductors, and wherein the key device is adapted to output a predetermined stored code when it is energized;
  a key connector having first and second electrical conductors adapted to contact the respective output and ground conductors of the key device, respectively;
  connector means for connecting between a predetermined port of the computer and the key connector, the connector means having a bidirectional data conductor and a ground conductor, the connector means further comprising a male connector and a mating female connector having their corresponding pins wired together to form a single connector having male and female ends, and wherein the connector means is adapted to permit coupling of an output device to the computer by way of the port; and
  a first conductor coupled between the bidirectional data conductor in the connector means and the first conductor of the key connector, and a second conductor coupled between the ground conductor of the connector means and the second conductor of the key connector;
  and wherein placing the key device into the key connector such that respective electrical conductors thereof come in contact energizes the key device which outputs the predetermined stored code to a computer coupled to the connector means.

11. The computer data security device of claim 10 wherein the connector means comprises a first resistor coupled between a first unidirectional output pin and a second unidirectional input pin of the connector means, and wherein a second resistor is coupled between the second unidirectional input pin of the male connector and a corresponding pin of the female connector, and wherein the first conductor is coupled to the first unidirectional input pin and the second conductor is coupled to the ground conductor.

12. The computer data security device of claim 11 wherein the connector means comprises a male connector and a mating female connector having their corresponding pins wired together to form a single connector having male and female ends, and wherein the connector means is adapted to permit coupling of an output device to the computer by way of the port.

13. A computer data security device for use with a computer having a parallel port, said device comprising:
  a key device comprising an integrated circuit having output and ground conductors, and wherein the key device is adapted to output a predetermined stored code when it is energized;
  a key connector having first and second electrical conductors adapted to contact the respective output and ground conductors of the key device, respectively;
  parallel port connector means for connecting between a predetermined parallel port of the computer and the key connector, the parallel port connector means having a bidirectional data conductor and a ground conductor, the connector means further comprising a male connector and a mating female connector having their corresponding pins wired together to form a single connector having male and female ends, and wherein the connector means is adapted to permit coupling of an output device to the computer by way of the port; and
  a first conductor coupled between the bidirectional data conductor in the connector means and the first conductor of the key connector, and a second conductor coupled between the ground conductor of the connector means and the second conductor of the key connector;
  and wherein placing the key device into the key connector such that respective electrical conductors thereof come in contact energizes the key device which outputs the predetermined stored code to a computer coupled to the parallel port connector means.

14. The computer data security device of claim 13 wherein the connector means comprises a first resistor coupled between a first unidirectional output pin and a second unidirectional input pin of the connector means, and wherein a second resistor is coupled between the second unidirectional input pin of the male connector and a corresponding pin of the female connector, and wherein the first conductor is coupled to the first unidirectional input pin and the second conductor is coupled to the ground conductor.

15. The computer data security device of claim 14 wherein the connector means comprises a male connector and a mating female connector having their corresponding pins wired together to form a single connector having male and female ends, and wherein the connector means is adapted to permit coupling of an output device to the computer by way of the port.

* * * * *